United States Patent
Cooper et al.

(10) Patent No.: US 9,739,142 B2
(45) Date of Patent: Aug. 22, 2017

(54) FIBER OPTIC VIBRATION MONITORING

(71) Applicants: Daniel Boyd Cooper, Christiansburg, VA (US); Erik N. Lee, Houston, TX (US)

(72) Inventors: Daniel Boyd Cooper, Christiansburg, VA (US); Erik N. Lee, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 393 days.

(21) Appl. No.: 14/459,475

(22) Filed: Aug. 14, 2014

(65) Prior Publication Data

US 2015/0075276 A1 Mar. 19, 2015

Related U.S. Application Data

(60) Provisional application No. 61/878,270, filed on Sep. 16, 2013.

(51) Int. Cl.
| | |
|---|---|
| *E21B 47/00* | (2012.01) |
| *E21B 47/12* | (2012.01) |
| *E21B 49/08* | (2006.01) |
| *G01S 15/88* | (2006.01) |
| *E21B 47/08* | (2012.01) |

(52) U.S. Cl.
CPC ........ *E21B 47/123* (2013.01); *E21B 47/0007* (2013.01); *E21B 47/00* (2013.01); *E21B 47/082* (2013.01); *E21B 49/081* (2013.01); *G01S 15/88* (2013.01)

(58) Field of Classification Search
CPC .................................................. E21B 47/082

USPC .......................................................... 73/152.58
See application file for complete search history.

(56) References Cited

U.S. PATENT DOCUMENTS

| | | | | |
|---|---|---|---|---|
| 6,751,556 | B2* | 6/2004 | Schroeder ............... | G01K 11/32 374/E11.015 |
| 7,040,390 | B2* | 5/2006 | Tubel ...................... | E21B 23/03 166/250.01 |
| 7,254,289 | B2* | 8/2007 | Wait .................... | H04B 10/2525 385/12 |
| 7,668,411 | B2* | 2/2010 | Davies ............... | G01M 11/3109 385/12 |
| 7,740,064 | B2* | 6/2010 | McCoy ................. | E21B 47/123 166/250.01 |
| 8,245,780 | B2* | 8/2012 | Fidan ....................... | G01V 8/16 166/250.03 |

(Continued)

OTHER PUBLICATIONS

Cooper, Daniel, 'Fiber Optic Vibration Monitoring' PCT/US2014/051177, Aug. 15, 2014, 9 pgs.*

(Continued)

*Primary Examiner* — Clayton E Laballe
*Assistant Examiner* — Kevin Butler
(74) *Attorney, Agent, or Firm* — Cantor Colburn LLP (57) ABSTRACT

An apparatus for monitoring vibration of a downhole component includes an optical fiber sensor including at least one optical fiber operably connected to an interrogation unit. The at least one optical fiber has a resonant segment that is fixedly attached to the component via attachment points on the component, the resonant segment between the attachment points being separate from the component and having a resonant frequency based at least on the length of the resonant segment.

20 Claims, 4 Drawing Sheets

(56) References Cited

U.S. PATENT DOCUMENTS

| | | | |
|---|---|---|---|
| 8,924,158 B2* | 12/2014 | Kragh | G01H 9/004 |
| | | | 702/17 |
| 9,140,815 B2* | 9/2015 | Lopez | G01V 1/16 |
| 9,222,828 B2* | 12/2015 | Fripp | G01H 9/004 |
| 9,234,999 B2* | 1/2016 | Koelman | G01H 9/004 |
| 9,316,754 B2* | 4/2016 | Kragh | E21B 47/02208 |
| 9,377,551 B2* | 6/2016 | Hartog | G01V 1/42 |
| 9,470,083 B2* | 10/2016 | Jaaskelainen | E21B 47/01 |
| 2005/0087344 A1* | 4/2005 | Toekje | E21B 23/04 |
| | | | 166/375 |
| 2005/0149264 A1* | 7/2005 | Tarvin | E21B 47/065 |
| | | | 702/6 |
| 2010/0018303 A1* | 1/2010 | Bostick, III | E21B 47/011 |
| | | | 73/152.16 |
| 2010/0038079 A1* | 2/2010 | Greenaway | E21B 47/0007 |
| | | | 166/254.2 |
| 2010/0219334 A1* | 9/2010 | Legrand | E21B 47/10 |
| | | | 250/256 |
| 2010/0300685 A1 | 12/2010 | Del Campo et al. | |
| 2011/0090496 A1* | 4/2011 | Samson | E21B 47/065 |
| | | | 356/301 |
| 2012/0013893 A1 | 1/2012 | Maida et al. | |
| 2012/0063267 A1* | 3/2012 | Hill | E21B 43/11857 |
| | | | 367/82 |
| 2012/0111104 A1 | 5/2012 | Taverner et al. | |
| 2012/0132417 A1* | 5/2012 | Dria | E21B 47/065 |
| | | | 166/250.01 |
| 2012/0179378 A1* | 7/2012 | Duncan | E21B 47/123 |
| | | | 702/8 |
| 2012/0205103 A1* | 8/2012 | Ravi | E21B 33/14 |
| | | | 166/285 |
| 2012/0230629 A1* | 9/2012 | Hill | G01D 5/35361 |
| | | | 385/12 |
| 2013/0092371 A1* | 4/2013 | Hartog | E21B 47/06 |
| | | | 166/250.01 |
| 2013/0093599 A1* | 4/2013 | Duncan | G01N 21/954 |
| | | | 340/854.7 |
| 2015/0075276 A1* | 3/2015 | Cooper | E21B 47/0007 |
| | | | 73/152.58 |
| 2016/0223710 A1* | 8/2016 | Barry | G01V 8/16 |
| 2016/0266265 A1* | 9/2016 | Kruspe | G01V 1/186 |

OTHER PUBLICATIONS

Conway, Chris et al., 'An introduction to fibre optic Intelligent Distributed Acoustic Sensing (iDAS) technology for power industry applications, Jicable' 15-Versailles, Jun. 21-25, 2015, 6 pgs.*

Daley, Thomas, Field testing of fiber-optic distributed acoustic sensing (DAS) for subsurface seismic monitoring, The Leading Edge, Jun. 2013, pp. 936-942.*

"Fiber-optic Vibration Monitoring System: Dectection and transmission of vibrations by invisible light beam", MC-monitoring SA; Giga-tech; 7 pages. www.mc-monitoring.com.

Notification of Transmittal of the International Search Report and the Written Opinion of the International Search Authority, or the Declaration; PCT/US2014/051177; Nov. 26, 2014, 9 pages.

* cited by examiner

FIBER OPTIC VIBRATION MONITORING

CROSS REFERENCE TO RELATED APPLICATIONS

This application claims the benefit of an earlier filing date from U.S. Provisional Application Ser. No. 61/878,270 filed Sep. 16, 2013, the entire disclosure of which is incorporated herein by reference.

BACKGROUND

Fiber-optic sensors have been utilized in a number of applications, and have been shown to have particular utility in sensing parameters in harsh environments. Optical fibers have utility in various downhole applications including communication and measurements, e.g., to obtain various surface and downhole measurements, such as pressure, temperature, stress and strain.

One such application is in downhole monitoring of vibration and acoustics. Exemplary technologies include distributed acoustic sensing (DAS) or distributed vibration sensing (DVS). Vibration monitoring has numerous applications, such as fluid characterization, leak detection and the condition monitoring of downhole components including borehole strings and electronic submersible pumps (ESPs). For many of these applications, the signals of interest may be comparatively faint or suffer from a low signal to noise ratio.

SUMMARY

An apparatus for monitoring vibration of a downhole component includes: an optical fiber sensor including at least one optical fiber operably connected to an interrogation unit, the at least one optical fiber having a resonant segment, the resonant segment fixedly attached to the component via attachment points on the component, the resonant segment between the attachment points being separate from the component and having a resonant frequency based at least on the length of the resonant segment.

A method of monitoring a downhole component includes: disposing a component at a downhole location; disposing an optical fiber sensor connected to the component at the downhole location, the optical fiber sensor including at least one optical fiber having a resonant segment, the resonant segment fixedly attached to the component via attachment points on the component, the resonant segment between the attachment points being separate from the component and having a resonant frequency based at least on the length of the resonant segment; transmitting an electromagnetic interrogation signal into the optical fiber sensor via an interrogation unit, and receiving reflected signals from sensing locations in the resonant segment of the optical fiber sensor; and estimating a vibration of the component based on the reflected signals.

BRIEF DESCRIPTION OF THE DRAWINGS

Referring now to the drawings, wherein like elements are numbered alike in the several Figures.

DETAILED DESCRIPTION OF EXEMPLARY EMBODIMENTS

Apparatuses, systems and methods for monitoring downhole components are provided. Such apparatuses and systems are used, in one embodiment, to detect and estimate vibrations and changes in vibration in components such as motors and generators. Embodiments use mechanical resonances to amplify or increase the magnitude of the strain or vibration applied to an optical fiber, and the corresponding optical signal available to be measured.

An embodiment includes a fiber optic sensor such as a measurement or communication cable including one or more optical fibers. The sensor is attached at a fixed position relative to a downhole component (e.g., production tubing or a motor) at various attachment points, at which a location or length of the optical fiber sensor is rigidly attached to the component. The segment of the optical fiber between successive attachment points is unattached to, i.e., not in contact with, the component, and is allowed to vibrate freely. In some embodiments, the segment of the optical fiber is not fixedly attached to the component, but is disposed within a cavity and allowed to vibrate within a medium (e.g., gas or other fluid). The segment is itself configured to vibrate and have a fundamental resonant frequency, which can be selected by selecting characteristics of the segment, such as the length of the segment between the attachment points (also referred to as a resonant length), material properties of the segment, and mass of the segment. In one embodiment, the segment is encapsulated within and allowed to vibrate within a cavity. The region defined by the cavity may be configured to affect the resonant frequency of the segment, e.g., by filling the cavity with a substance such as a gas or fluid (e.g., a gel) having characteristics such as density and compressibility that affect the resonant frequency.

In one embodiment, a segment of the optical fiber sensor (e.g., a fiber optic cable) is attached at the attachment points and allowed to vibrate therebetween. In another embodiment, an optical fiber itself is allowed to vibrate between the attachment points, while other components of the optical fiber sensor are attached to the component as desired. For example, an optical fiber cable is attached such that continuous portion of cable is fixed relative to the component, and a segment of an optical fiber within the cable is attached via the attachment points and allowed to vibrate therebetween.

Figure 1:
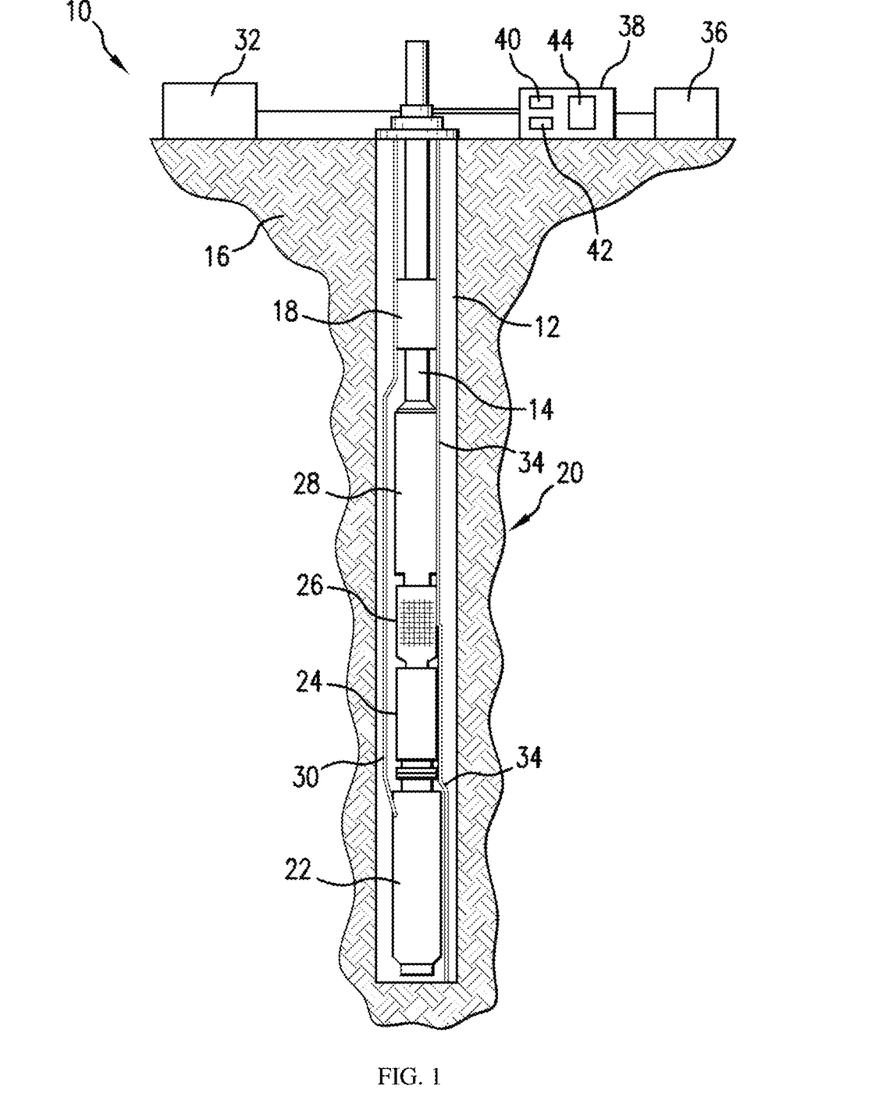
FIG. 1 is a cross-sectional view of an embodiment of a downhole drilling, monitoring, evaluation, exploration and/or production system.

Referring to FIG. 1, an exemplary embodiment of a downhole drilling, monitoring, evaluation, exploration and/or production system 10 associated with a wellbore 12 is shown. A borehole string 14 is disposed in the wellbore 12, which penetrates at least one earth formation 16 for facilitating operations such as drilling, production and making measurements of properties of the formation 16 and/or the wellbore 12 downhole. The borehole string 14 includes any of various components to facilitate subterranean operations. The borehole string 14 is made from, for example, a pipe, multiple pipe sections or flexible tubing. The borehole string 14 includes for example, a drilling system and/or a bottom-hole assembly (BHA).

The system 10 and/or the borehole string 14 include any number of downhole tools 18 for various processes including drilling, hydrocarbon production, and formation evaluation (FE) for measuring one or more physical quantities in or around a borehole. For example, the tools 18 include a drilling assembly and/or a pumping assembly. Various measurement tools may be incorporated into the system 10 to affect measurement regimes such as wireline measurement applications or logging-while-drilling (LWD) applications.

In one embodiment, the borehole string 14 is configured as a production string and includes an electrical submersible pump (ESP) assembly 20 as part of, for example, a bottom-hole assembly (BHA). The ESP assembly 20 is utilized to pump production fluid through the production string 14 to the surface. The ESP assembly 20 includes components such as a motor 22, a seal section 24, an inlet or intake 26 and a pump 28. The motor 22 drives the pump 28, which takes in fluid via the inlet 26, and discharges the fluid at increased pressure into the production string 14. The motor 22, in one embodiment, is supplied with electrical power via an electrical conductor such as a downhole power cable 30, which is operably connected to a power supply system 32.

The system 10 also includes one or more fiber optic components configured to perform various functions in the system 10, such as communication and sensing various parameters. An exemplary fiber optic component is a fiber optic sensor 34 configured to measure downhole properties such as temperature, pressure, downhole fluid composition, stress, strain, vibration and deformation of downhole components such as the borehole string 14 and the tools 18. The optical fiber sensor 34 includes at least one optical fiber having one or more sensing locations disposed along the length of the optical fiber sensor 34. Examples of sensing locations include fiber Bragg gratings (FBG), mirrors, Fabry-Perot cavities and locations of intrinsic scattering. Locations of intrinsic scattering include points in or lengths of the fiber that reflect interrogation signals, such as Rayleigh scattering and Brillouin scattering locations. The optical fiber sensor 34 can be configured as a cable or other elongated member, and may include additional features such as strengthening and/or protective layers or members, and additional conductors such as electrical conductors and additional optical fibers for sensing and/or communication.

The system 10 includes an optical fiber monitoring system configured to interrogate the optical fiber sensor 34 to estimate a parameter (e.g., vibration) of the tool 18, ESP assembly 20 or other downhole component. In one embodiment, the monitoring system is configured to detect and/or measure vibration of downhole component(s), which may include any type of tool or component that experiences and/or generates vibration, deformation or stress downhole. Examples of tools that experience vibration include motors or generators such as ESP motors, other pump motors and drilling motors, as well as devices and systems that include or otherwise utilize such motors.

As described herein, "vibration" refers to any oscillatory motion and effects thereof. Accordingly, estimations of vibration can encompass estimations of vibratory motion of a component as well as acoustic waves and other mechanical waves resulting from the component or from other sources (e.g., borehole fluid and acoustic events in a formation).

In one embodiment, at least a portion of the optical fiber sensor 34 is affixed to one or more downhole components. The optical fiber sensor 34 is fixedly attached to the component at selected locations or along selected lengths of the component to form discrete attachment points that define at least one section or segment of the optical fiber sensor 34 that is unattached to the component and can vibrate freely between the attachment points. In this way, the sensor segment itself is made resonant and forms a resonator having a fundamental frequency and/or other resonant frequencies that can be tuned to selected frequencies. Such selected frequencies can include expected frequencies experienced by the downhole component and/or produced by the component. The vibrating segment thus amplifies the vibration of the downhole component and increases the signal to noise ratio of the signal generated by the optical fiber sensor 34.

The optical fiber monitoring system may be configured as a distinct system or incorporated into other fiber optic systems. For example, the monitoring system may incorporate existing optical fiber components such as communication fibers and temperature or strain sensing fibers. Examples of monitoring systems include, but are not limited to, Extrinsic Fabry-Perot Interferometric (EFPI), Intrinsic Fabry-Perot Interferometric (IFPI), fiber Bragg grating (FBG), optical frequency domain reflectometry (OFDR) and optical time domain reflectometry (OTDR) systems.

In one embodiment, the monitoring system includes an interrogation unit configured to transmit an electromagnetic interrogation signal into the optical fiber sensor 34 and receive a reflected signal from one or more locations in the optical fiber sensor 34. An example of an interrogation unit is a reflectometer unit 38 illustrated in FIG. 1. The reflectometer unit 38 is operably connected to one or more optical fiber sensors 34 and includes a signal source 40 (e.g., a pulsed light source, LED, laser, etc.) and a signal detector 42. The signal source (e.g., laser) may be modulated or frequency swept. In one embodiment, a processor 44 is in operable communication with the signal source 40 and the detector 42 and is configured to control the source 40 and receive reflected signal data from the detector 42. The reflectometer unit 38 includes, for example, an OFDR and/or OTDR type interrogator to sample components such as the ESP assembly 20 and/or tool 18. The interrogator is not limited to those described herein, and may be any suitable type of interrogator (e.g., an IFPR or EFPR interrogator). The location of the interrogation unit is not limited to that shown in embodiments discussed herein. The interrogation unit (or a component thereof such as a detector and/or signal source) may be disposed downhole, e.g., at a borehole string or BHA.

Figure 2:
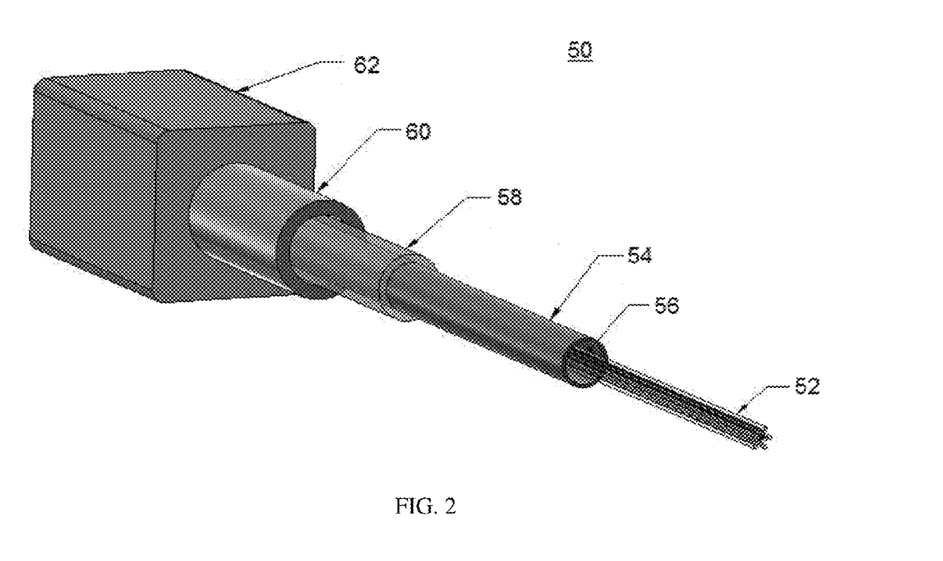
FIG. 2 is an illustration of an exemplary optical fiber cable of an optical fiber sensor.

FIG. 2 illustrates an embodiment of an optical fiber cable 50 that may be utilized as a vibration monitoring optical fiber sensor (e.g., the optical fiber sensor 34 shown in FIG. 1). In one embodiment, the cable 50, or one or more optical fibers disposed therein, is incorporated with a downhole component and is fixedly attached to the component along selected lengths of the cable and/or at specific attachment points.

In this embodiment, the cable 50 includes one or more optical fibers 52 (e.g., up to 12 fibers) disposed within a tubular 54. An exemplary tubular is a metal tubular such as a stainless steel tube, but may be any suitable material such as a metal alloy or polymeric material. In one embodiment, the optical fibers 52 are hermetically sealed within the tubular 54, e.g., in a Fiber In Metal Tube (FIMT) configuration. A fluid 56 such as a thixotropic gel (e.g., a mineral oil compound) may be encapsulated within the tubular as a filling compound. Various types of gels may be used having characteristics including hydrogen scavenging and temperature stabilization characteristics. In instances where hydrogen diffusion is a concern, the fibers may include protective layers such as a carbon coating to resist hydrogen diffusion. The fluid is not limited to those described herein.

In addition to the optical fibers 52 and protective tubular 54, the cable 50 may include additional protective layers or members. For example, the cable 50 includes a belting layer 58 surrounding the tubular 54. The belting layer 58 may be a polymeric layer including materials such as polymethylpentene (TPX) and Perfluoroalkoxy (PFA). Other layers include a cladding 60 (e.g., Inconel or other metallic material) and an encapsulation 62 (e.g., polypropylene, MFA (perfluoromethylalkoxy), Halar tubing). Other components may also be included within the cable or disposed with the cable, such as electrical conductors, additional optical fibers control lines, communication lines, and strengthening members (e.g., strands).

Figure 3:
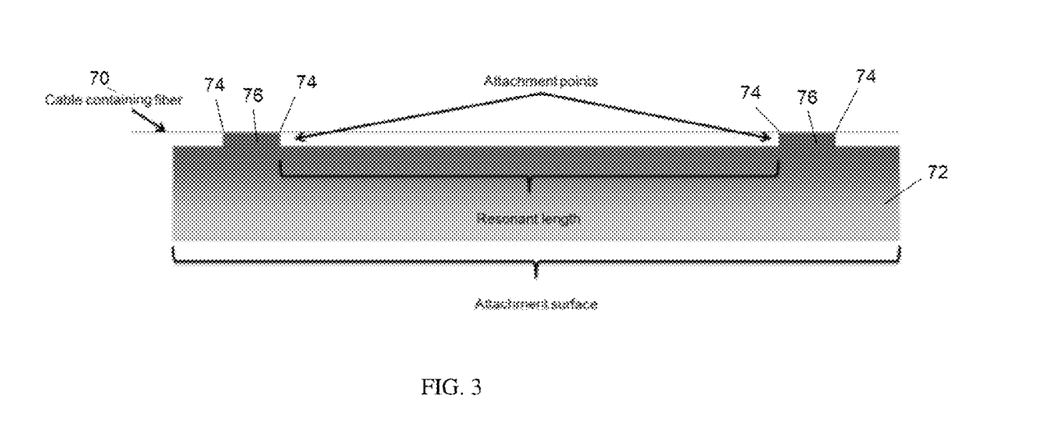
FIG. 3 is a cross-sectional view of an embodiment of a portion of an optical fiber sensor, including a segment of the optical fiber sensor configured as a resonator disposed between fixed attachment points.
Figure 4:
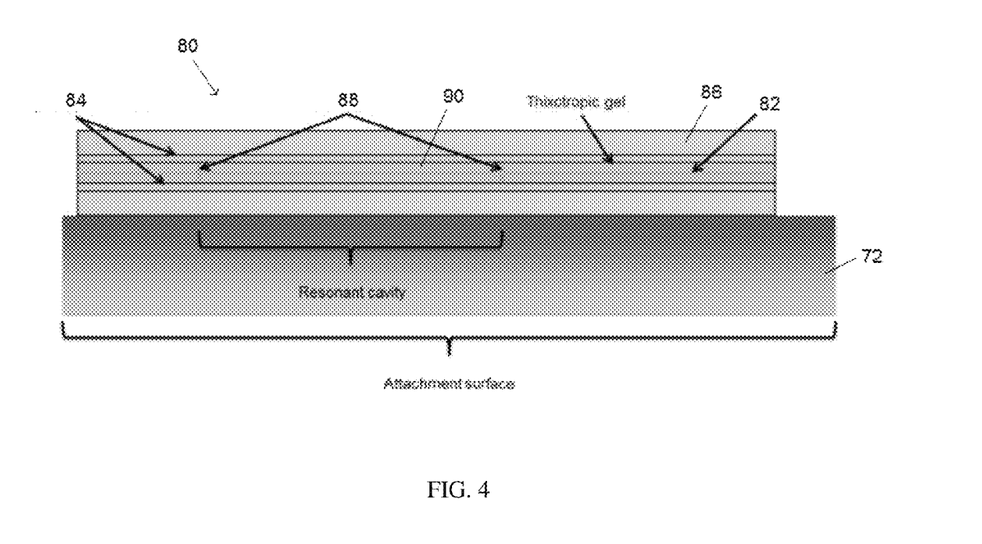
FIG. 4 is a cross-sectional view of an embodiment of a portion of an optical fiber sensor, including a segment of an optical fiber sensor configured as a resonator disposed in a resonant cavity.
Figure 5:
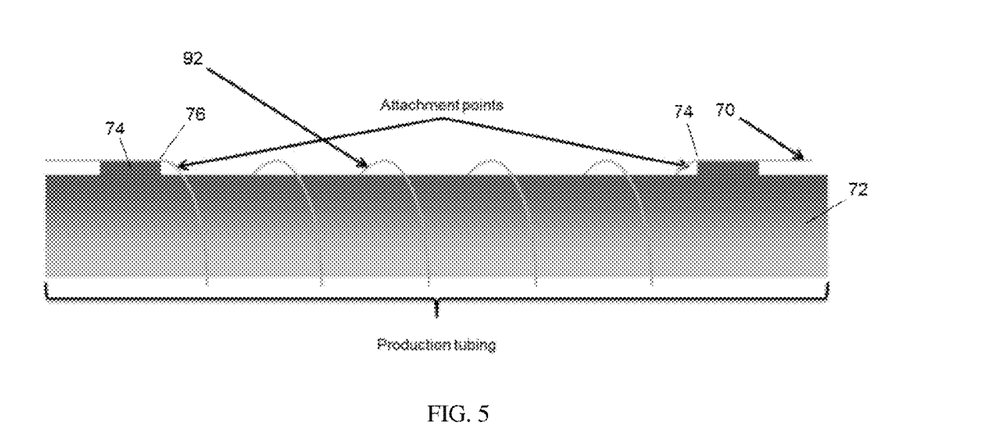
FIG. 5 is a cross-sectional view of an embodiment of a portion of an optical fiber sensor, including a segment of the optical fiber sensor configured as a coil spring disposed between fixed attachment points.

FIGS. 3-5 show embodiments of an optical fiber sensor assembly configured for vibration monitoring. In these embodiments, an optical fiber sensor 70 such as the cable 50 is attached to a downhole component 72 at selected locations. For example, the optical fiber sensor 70 is configured as the optical fiber sensor 34 of FIG. 1, and the downhole component is a component of the system 10, such as the borehole string 14 and/or components of the ESP assembly 20. It is noted that the optical fiber sensor is not limited to the embodiments described herein, and may be any assembly including one or more optical fibers where the optical fiber itself or another component of the assembly (e.g., a cable layer) is attached to the downhole component at selected attachment points.

In these embodiments, the optical fiber sensor 70 or an optical fiber itself is fixedly disposed relative to the downhole component at a number of attachment points. For example, rigid structures are attached to the component directly (e.g., extending outwardly from a component surface) or indirectly (e.g., attached to components of a fiber optic cable). The optical fiber or optical fiber sensor is affixed to the rigid structures, forming attachment points that remain at a fixed position relative to the component. The optical fiber sensor 70 or the optical fiber is held in tension between the attachment points.

A segment of the optical fiber and/or sensor is unattached between the attachment points and held in tension by the attachment points, thus forming a resonator having a resonant frequency dependent on factors such as the length of the segment between the attachment points, the mass of the segment, and the tension in the segment. The segment may include distributed sensing features such as intrinsic scattering locations or Bragg gratings, or may include point sensors such as reflectors or Fabry-Perot cavities.

Referring to FIG. 3, in one embodiment, the optical fiber sensor 70 is connected to a surface of the component 72 at attachment points 74, such that the length of the sensor 70 along a region of interest of the component is allowed to vibrate freely between the attachment points 74. For example, the sensor 70 is connected to the surface of the component 72 by attaching the sensor 70 to structures 76, which can be an integral part of the component or a separate structure affixed to the component. The distance between the attachment points, or resonant length, is selected based on a selected vibration frequency, which may correspond to the expected vibration of the component caused by, e.g., an ESP, drilling assembly, or seismic events in the borehole or in the formation. The segment of the sensor 70 between the attachment points 74 has a fundamental resonant frequency corresponding to the first bending mode defined by the length between the points and the mechanical properties and geometry of the cable.

In one example, the optical fiber sensor 70 is configured as a control line or cable such as the cable 50. The cable 50, including the fibers and thixotropic core, is free to vibrate between the attachment points 74.

In one embodiment, the sensor 70 is periodically attached to define a plurality of resonant segments along the component. The lengths of the segments may be equal or at least substantially equal, or one or more of the lengths can be different to provide resonant frequencies corresponding to multiple frequencies for which sensitivity is desired.

The structure 76 can be any structure or configuration that provides a fixed attachment point between the optical fiber sensor 70 and the component 72. For example, the structure 76 is a rigid structure integral to or affixed to the component 72. The structure 76 may also include features configured to facilitate tuning the segment to a selected resonant frequency or frequencies. For example, the structure 76 includes an elastic element such as a rubber pad between the cable and the attachment points, which can be made from a material having a selected elastic modulus or other characteristics to control the impedance of the connection. This allows for further modification of the fundamental frequency of the segment spanning the attachment points in addition to changing the distance between the attachment points.

Characteristics of the segment itself may be selected to control the resonant frequency or frequencies. For example, the mass of the segment can be selected by placing an external sleeve, or other device that does not compromise the integrity of the sensor, around the segment to modify its moment of inertia between the attachment points. In addition, material characteristics of the sensor or components thereof (e.g., FIMT and/or external layers) such as elastic modulus or stiffness may be selected. Selection of such characteristics allows modification of the fundamental resonant frequency of the segment spanning the attachment points.

FIG. 4 illustrates an example of another embodiment of the sensor 70, in which the optical fiber or sensor is disposed within a resonant cavity. The cavity may be any space defined by an encapsulating structure or structures, such as a hollow tube or a cavity formed by a surface of the component 72 and an attached structure such as a sleeve or panel defining a volume in which the fiber sensor is free to vibrate between the attachment points. The cavity may be hollow, or filled with a substance that affects the resonant and/or fundamental frequency.

For example, the optical fiber sensor 70 includes a cable 80 including at least one optical fiber 82, a tubular 84 surrounding the fiber 82, and one or more outer layers 86. The entirety of a length of the outer layer 86 is rigidly attached to a surface of the component 72. The attached length encompasses the entire length of each resonant segment of the optical fiber 82. Each end of a segment of the optical fiber 82 is attached to rigid structures such as an internal wall 88. The internal walls 88 are separated in the tubular 84 to form a cavity 90 having a length corresponding to a selected resonant frequency. Thus, this segment of the cable will strongly vibrate proportionally to its loading, producing a strong signal at the frequency of interest and increasing the signal to noise ratio of vibration measurement signals.

In one embodiment, the cavity is filled with a material having characteristics such as density that affect the fundamental resonant frequency of the segment in the cavity (relative to the resonant frequency of the segment in, e.g., air or a vacuum). In one embodiment, the fundamental resonant frequency of the cavity is given by:

$$f_r = \frac{c}{4L},$$

where c represents the speed of sound of the material filling the cavity, and L represents the cavity's length.

In the example shown in FIG. 4, the cavity 90 is defined by the tubular 84 and the internal walls 88, and the length of the optical fiber 82 between the walls 88 is sealed off from the rest of the tubular and the environment around the sensor and allowed to vibrate in the cavity.

In one embodiment, the cavity is filled with a gas or fluid having a density, viscosity or other characteristic that can be selected to affect the resonant frequency. For example, the cavity is filled with a thixotropic gel such as that described with reference to the cable 50. As with other embodiments, multiple cavities can be formed periodically, and may have the same or different lengths. In addition, the cavities can have the same filler material or different filler materials.

In one embodiment, the filler material has a bulk modulus selected to control the fundamental frequency. For example, the fundamental frequency of the segment in the cavity is reduced by selecting or modifying the material to reduce the bulk modulus. A filler material such as a gas can be disposed in the cavity, having a volume that can be selected to reduce the fundamental frequency as desired. Reducing the fundamental frequency allows cavities with relatively short lengths to have much lower resonant frequencies than might otherwise be possible.

In one example, the speed of sound in a material can be reduced by lowering the bulk modulus of a filler material, such as one used in a fiber optic cable. Such a material (e.g., a thixotropic gel), has beneficial properties such as strain reduction and hydrogen protection that are beneficial to the cable design.

However, since the resonant mode spans the entire cavity, it can be difficult to distinguish between different frequencies within the resonant cavity. The speed of sound in the gel may be reduced through the introduction of bubbles into a gel or other filler material to form a multiphase fluid. The bubbles, in one embodiment, are sufficiently small such that the gel acts as a single material acoustically. The bubbles have the effect of significantly decreasing the bulk modulus of the material (making it much more compressible), and as a result decreasing the speed of sound according to:

$$c = \sqrt{\frac{B}{\rho}},$$

where B represents the bulk modulus of the fluid and ρ represents the density of the fluid. In some embodiment, the sound speed through the filler material is a function of temperature. Thus, in one embodiment, the temperature is estimated downhole via, e.g., a distributed temperature sensor (DTS) or discrete temperature sensors.

Although the optical fiber sensors described in the above embodiments are shown as forming a straight path between the attachment points, the embodiments are not so limited. Each resonant segment may follow any suitable path between the attachment points. For example, as shown in FIG. 5, the optical fiber sensor 70 includes a coiled segment 92 that is wrapped around the component along a spiral or helical path. In this example, the component 72 is a cylindrical or tubular element such as a pipe section or tubing, production tubing, a collar and others. The segment 92 is wrapped around the production tubing in the vicinity of interest, and has sufficient stiffness to maintain a separation between the segment 92 and the surface of the component 72. The segment 92 in this configuration act as a coil spring having a mechanical resonance. The fundamental frequency of the segment 92 can be controlled, e.g., by modifying the amount of mass added to the segment 92, the stiffness of the segment 92 and/or the pitch with which the segment 92 is wrapped around the component 72.

The monitoring system 10, optical fiber sensors, tools 18, ESP 20 and motors are not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

Figure 6:
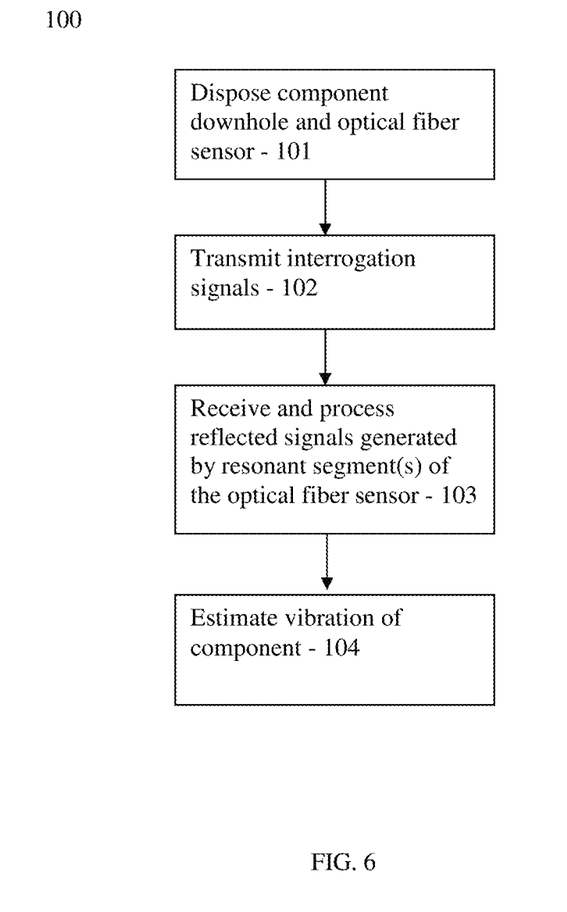
FIG. 6 is a flow chart illustrating a method of monitoring vibration and/or other parameters of a downhole tool.

FIG. 6 illustrates a method 100 of monitoring vibration and/or other parameters of a downhole tool. The method 100 includes one or more of stages 101-104 described herein. The method 100 may be performed continuously or intermittently as desired. The method may be performed by one or more processors or other devices capable of receiving and processing measurement data, such as the surface processing unit 36 and the reflectometer unit 38. In one embodiment, the method includes the execution of all of stages 101-104 in the order described. However, certain stages 101-104 may be omitted, stages may be added, or the order of the stages changed.

In the first stage 101, a component such as the tool 18 and/or the ESP assembly 20 is lowered into or otherwise disposed in the borehole 12. In one embodiment, the ESP motor 22 is started and production fluid is pumped through the ESP assembly 20 and through the production string 14 to a surface location.

In the second stage 102, at least one interrogation signal is transmitted into at least one optical fiber sensor, such as the optical fiber sensor 34, 70, or the cable 80, which is fixedly connected to the downhole component at a number of attachment points. In one embodiment, for example as part of an OTDR method, a plurality of coherent interrogation signal pulses are transmitted into the fiber sensor.

In the third stage 103, signals reflected from sensing locations in the vibrating optical fiber sensor (e.g., reflectors, Bragg gratings and/or Rayleigh scattering locations) are received by the reflectometer unit 38 for each interrogation signal and/or pulse. The reflected signals are processed to correlate the reflected signals to locations corresponding to one or more resonant segments of the optical fiber sensor.

In the fourth stage 104, the reflected signals are analyzed to estimate vibration of the one or more resonant segments and estimate component vibration therefrom. For example, a phase difference between reflected signals from pairs of sensing locations in each resonant segment is estimated. Phase difference information (e.g., phase difference patterns) may be generated for multiple interrogation signals over a selected time period. In this way, time-varying distributed phase differential measurements are generated for the resonant segments. The time-varying phase differential patterns may be correlated to a vibration of the downhole component (e.g., the ESP motor 22).

In one embodiment, other parameters associated with the ESP may also be measured. Such parameters include, for example, temperature, strain, pressure, etc. For example, the optical fiber 34 may also include additional sensing components such as Bragg gratings that can be utilized to measure temperature as part of a DTS system.

The systems and methods described herein provide various advantages over prior art techniques. The systems and methods provide a mechanism to measure vibration that produces a vibration signal having a higher signal to noise than other techniques and systems. Embodiments described herein allow for tuning vibration sensors to amplify selected frequencies without the addition of complex or expensive components and without requiring separate devices to amplify vibrations.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for monitoring vibration of a downhole component, the apparatus comprising:
an optical fiber sensor including at least one optical fiber operably connected to an interrogation unit, the at least one optical fiber having a resonant segment, the resonant segment fixedly attached to the component via attachment points on the component, the resonant segment between the attachment points being separate from the component and having a selected resonant frequency, the resonant segment having a length defined by the attachment points, the length configured to cause the resonant segment to have the selected resonant frequency.

2. The apparatus of claim 1, wherein the resonant segment is held in tension between the attachment points.

3. The apparatus of claim 1, wherein the attachment points are configured to rigidly attach ends of the resonant segment to the component selected resonant frequency is a frequency of at least one of mechanical vibration and fluid vibration.

4. The apparatus of claim 1, wherein the resonant segment between the attachment points is not in contact with the component and is allowed to vibrate freely.

5. The apparatus of claim 1, wherein the resonant segment is disposed within a cavity attached to the component.

6. The apparatus of claim 5, wherein the cavity is filled with a filler material configured to alter the resonant frequency.

7. The apparatus of claim 6, wherein the filler material is a multiphase fluid.

8. The apparatus of claim 1, wherein the resonant frequency is selected based on an expected vibrational frequency of the component.

9. The apparatus of claim 1, wherein at least a portion of the optical fiber sensor is disposed within a tubular that is rigidly attached to the component, and the attachment points are rigid structures extending from an interior surface of the tubular.

10. The apparatus of claim 1, wherein the resonant segment follows a spiral path around the component.

11. A method of monitoring a downhole component, the method comprising:
disposing a component at a downhole location;
disposing an optical fiber sensor connected to the component at the downhole location, the optical fiber sensor including at least one optical fiber having a resonant segment, the resonant segment fixedly attached to the component via attachment points on the component, the resonant segment between the attachment points being separate from the component and having a selected resonant frequency, the resonant segment having a length defined by the attachment points, the length configured to cause the resonant segment to have the selected resonant frequency;
transmitting an electromagnetic interrogation signal into the optical fiber sensor via an interrogation unit, and receiving reflected signals from sensing locations in the resonant segment of the optical fiber sensor; and
estimating a vibration of the component based on the reflected signals.

12. The method of claim 11, wherein the resonant segment is held in tension between the attachment points.

13. The method of claim 11, wherein the attachment points are configured to rigidly attach ends of the resonant segment to the component.

14. The method of claim 11, wherein the resonant segment between the attachment points is not in contact with the component and is allowed to vibrate freely.

15. The method of claim 11, wherein the resonant segment is disposed within a cavity attached to the component.

16. The method of claim 15, wherein the cavity is filled with a filler material configured to alter the resonant frequency.

17. The method of claim 16, wherein the filler material is a multiphase fluid.

18. The method of claim 11, wherein the resonant frequency is selected based on an expected vibrational frequency of the component.

19. The method of claim 11, wherein at least a portion of the optical fiber sensor is disposed within a tubular that is rigidly attached to the component, and the attachment points are rigid structures extending from an interior surface of the tubular.

20. The method of claim 11, wherein the resonant segment follows a spiral path around the component.

\* \* \* \* \*